Patented Sept. 19, 1933

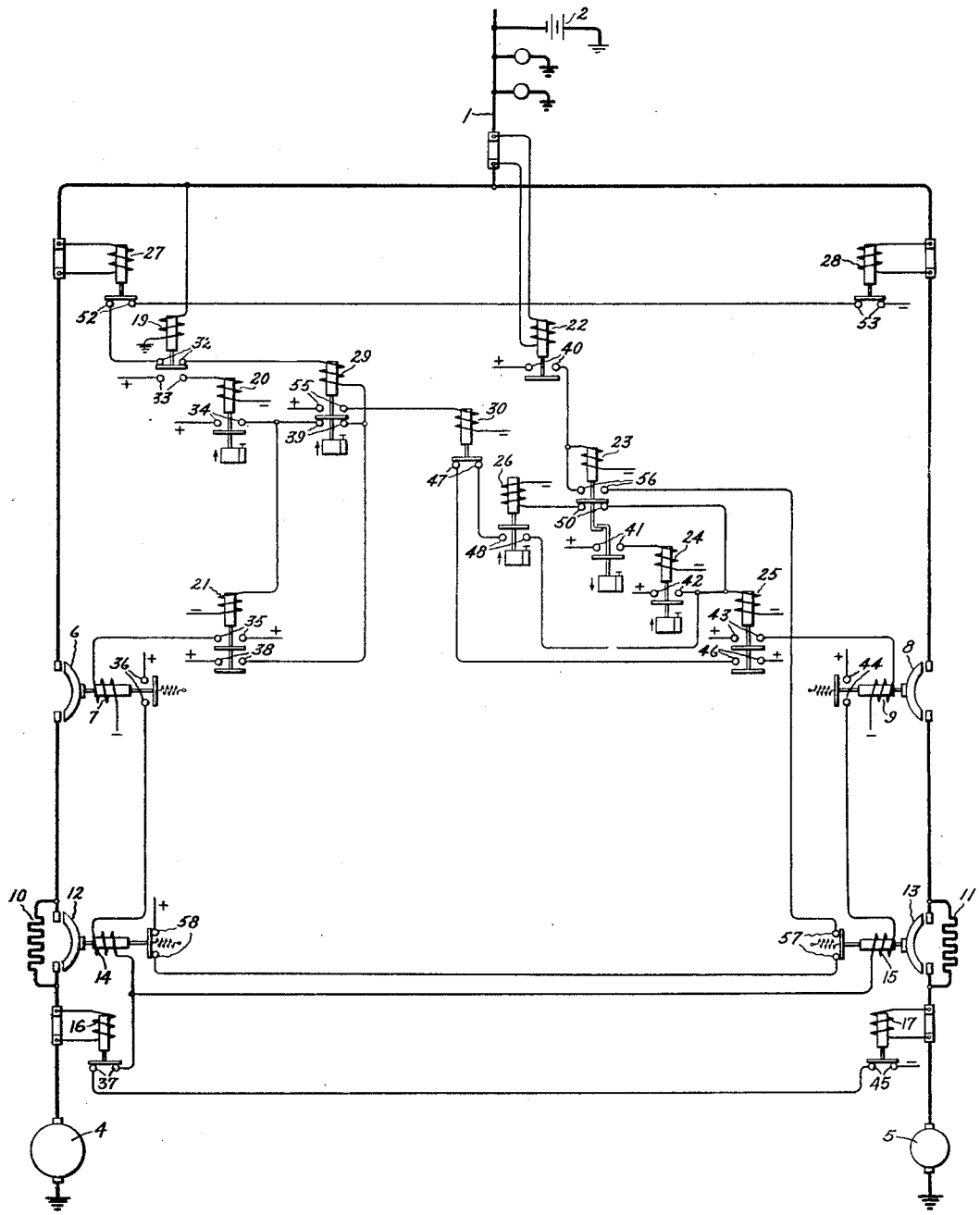

1,927,797

UNITED STATES PATENT OFFICE 1,927,797

AUTOMATIC SWITCHING EQUIPMENT

Daniel C. Hoffmann, Philadelphia, Pa., assignor to General Electric Company, a corporation of New York Application May 18, 1932. Serial No. 612,142

6 Claims. (Cl. 171—118)

My invention relates to automatic switching equipments for multiple unit automatic stations and particularly to equipments which are arranged to place additional units in operation automatically as the load connected to the station increases above predetermined values.

In certain types of switching equipments for units in an automatic station, means are provided for decreasing the output of a unit under abnormal load conditions. When the units of a multiple unit automatic station are provided with such output decreasing means and the station is also provided with suitable timing means for effecting after a predetermined time the operation of an additional unit in response to a predetermined output of the units in operation, there is the possibility that under certain abnormal load conditions the output reducing means of the units in service may so reduce the station output that the timing means is not operated for a sufficient length of time to effect the placing of an additional unit in service, although the load conditions are such that the additional unit should be placed in service. One object of my invention is to provide an improved arrangement for insuring that an additional unit is placed in service under such current conditions.

My invention will be better understood from the following description when taken in connection with the accompanying drawing which diagrammatically illustrates an automatic switching equipment for a two unit automatic station embodying my invention and its scope will be pointed out in the appended claims.

Referring to the drawing, 1 represents a direct current load circuit which is normally supplied by means of a suitable source such as battery 2. The load circuit 1 is also arranged to be supplied with current from a two-unit automatic station including the sources 4 and 5 which may be of any suitable type examples of which are well known in the art. As shown in the drawing, these sources are direct current generators. Each source of current may have associated therewith suitable automatic switching means, examples of which are well known in the art, for effecting the starting of the source and the connection thereof to the load circuit. In order to simplify the disclosure, however, it is assumed that each of the sources is normally in an operative condition to supply current to the load circuit and only a simplified switching arrangement is diagrammatically shown in the drawing for effecting the connection of each source to the load circuit.

As shown in the drawing, the source 4 is arranged to be connected to the load circuit 1 by a suitable switch 6 when the closing coil 7 thereof is energized and the source 5 is arranged to be connected to the load circuit 1 by a suitable switch 8 when the closing coil 9 thereof is energized.

In order to limit the current supplied to the load circuit 1 under abnormal load conditions, each source is provided with suitable means, examples of which are well known in the art, for limiting the current output of the source under such abnormal load conditions. In the arrangement shown in the drawing, this result is accomplished by providing suitable current limiting means, such as the resistors 10 and 11 respectively, in series with the sources 4 and 5 and normally having these resistors 10 and 11 respectively short-circuited by suitable switches 12 and 13 which are arranged to be opened when the current output of either source exceeds a predetermined value. As shown, the switches 12 and 13 are respectively provided with closing coils 14 and 15 which, as long as they are energized, maintain the respective switches closed. In order to effect the opening of the switches 12 and 13 in response to a predetermined current output of either source, the circuits of the closing coils 14 and 15 are controlled by the series connected contacts of suitable over-current relays 16 and 17 which are respectively connected so that they are energized in response to the currents flowing through the sources 4 and 5. The overcurrent relays 16 and 17 are of the well-known type which requires a much larger current through its coil to cause it to open its contacts than the value of current at which it closes its contacts. These relays are so designed that whenever one of them operates to open its contacts and effect the insertion of the associated current limiting resistor, the decrease in current due to this current limiting resistor being inserted in circuit does not decrease the current through the relay sufficiently to cause it to close its contacts.

In multiple unit automatic stations, it is the usual practice to place one machine in operation and then start the second machine when the load on the station exceeds a predetermined value. In the particular arrangement shown in the drawing the source 4 is arranged to be connected to the load circuit 1 when the voltage across the load circuit remains below a predetermined value for a predetermined time and the source 5 is arranged to be connected to the load circuit 1 when the current output of the source 4 remains above a predetermined value for a predetermined time. The sources 4 and 5 are arranged to be disconnected successively from the load circuit when the current output of the station remains below predetermined values for predetermined times.

In order to accomplish these results, a contact making voltmeter 19 is connected across the load circuit 1 and is arranged to complete an energizing circuit for a time relay 20 when the load circuit voltage is below a predetermined value. After the relay 20 has been energized for a predetermined time, it completes a circuit for the master relay 21 of the automatic switching means for the source 4. The energization of the master relay 21 effects the closing of the switches 6 and 12 so that the source 4 is connected directly to the load circuit.

In order to effect the connection of the source 5 to the load circuit when the current output of the source 4 exceeds a predetermined value, a current relay 22 is connected in series with the load circuit so that it is energized in response to the current output of the station. When the station output exceeds a predetermined value, the current relay 22 completes a circuit for the control relay 23 which, in turn, completes a circuit for the time relay 24. If the time relay remains energized for a predetermined time, it completes a circuit for the master relay 25 of the automatic switching means for the source 5. The energization of the master relay 25 effects the closing of the switches 8 and 13 so that the source 5 is connected directly to the load circuit 1.

For effecting the disconnection of the sources 4 and 5 in response to predetermined values of the current output of the station, the current responsive relay 22 is arranged to effect the energization of a time relay 26 when the station output is below a predetermined value. After the relay 26 has been energized for a predetermined time, it effects the deenergization of the master relay 25 which, in turn, effects the opening of the switches 8 and 13 so that the source 5 is disconnected from the load circuit 1.

When the current output of the station decreases to such a value that the current outputs of both of the sources 4 and 5 are below predetermined values as indicated by the closed contacts 52 and 53 of the current relays 27 and 28, which are respectively connected so as to be energized by the current outputs of the sources 4 and 5, and the voltage of the load circuit 1 is normal, a circuit is completed for a time relay 29. After the relay 29 has been energized for a predetermined time, it effects the opening of the switches 6 and 12 so that the source 4 is disconnected from the load circuit 1. The relay 29 is also arranged to effect the energization of a control relay 30 so as to effect the deenergization of the master relay 25 if for any reason the time relay 26 has not effected the deenergization of this relay 25.

With the arrangement shown in the drawing, a load condition on the load circuit 1 such that source 4 is overloaded will cause the relay 22 to close its contacts and start the timing means 24 into operation. Also a severe overload condition may cause the relay 16 to open its contacts and effect the deenergization of the closing coil 14 so that the switch 12 opens the shunt around the current-limiting resistor 10 in series with the source 4. Under certain conditions, the resistor 10 may decrease the current output of the source 4 sufficiently to cause the relay 22 immediately to open its contacts. If no other means were provided, the relay 22 would then stop the operation of the timing means 24 so that the automatic switching means associated with the source 5 would not be operated to effect the connection of the source 5 to the load circuit although the load conditions are such that it should be connected thereto. In order to insure that the timing means 24 remains in operation under such conditions, I provide in accordance with my invention an arrangement whereby, after operation of the timing means 24 has been started, it remains in operation although the opening of the switch 12 may effect thereafter such a decrease in the output of the source 4 that the relay 22 opens its contacts before the timing means 24 completes its timing operation. In the particular arrangement shown in the drawing this result is accomplished by having the control relay 23 complete a locking circuit for its operating coil, when the relay is in its energized position, through auxiliary contacts on the switches 12 and 13 when they are in their open position. The contacts of the control relay 23 which are in the energizing circuit of the time relay 24 are also provided with suitable means so that they do not open until after the operating coil of the relay 23 has been deenergized for a predetermined time.

The operation of the arrangement shown in the drawing is as follows: When the sources 4 and 5 are disconnected from the load circuit 1 and the load circuit voltage decreases below a predetermined value, the contact making voltmeter 19 opens its contacts 32 and closes its contacts 33 so that an energizing circuit is completed for the time relay 20. If the load circuit voltage remains below the predetermined value for a predetermined time, the relay 20 closes its contacts 34 and completes an energizing circuit for the master relay 21. By closing its contacts 35, the master relay completes an energizing circuit for the closing coil 7 of the switch 6 so that the source 4 and the resistor 10 are connected in series across the load circuit 1. As soon as the switch 6 closes, a circuit is completed through its auxiliary contacts 36 and the contacts 37 and 45 of the overcurrent relays 16 and 17 respectively, for the operating coil 14 of the switch 12 so that this switch is closed to short-circuit the resistor 10. By closing its contacts 38, the master relay 21 also completes a locking circuit for its operating coil through the contacts 39 of the time relay 29.

When the current output of the source 4 exceeds a predetermined value, the current relay 22 closes its contacts 40 and completes an energizing circuit for the control relay 23 which, in turn, completes through its contacts 41 an energizing circuit for the time relay 24. If the current output of the source 4 remains above a predetermined value for a predetermined time, the time relay 24 closes its contacts 42 and completes an energizing circuit for the master relay 25. By closing its contacts 43, the master relay 25 completes an energizing circuit for the closing coil 9 of the switch 8 so that the source 5 and the resistor 11 are connected in series across the load circuit 1. As soon as the switch 8 closes, a circuit is completed through its auxiliary contacts 44 and the contacts 37 and 45 of the overcurrent relays 16 and 17 respectively for the operating coil 15 of the switch 13 to complete a shunt around the current limiting resistor 11. By closing its contacts 46 the master relay 25 also completes a locking circuit for its operating coil through the contacts 47 of the control relay 30 and the contacts 48 of the time relay 26, which is deenergized as soon as the control relay 23 is energized and opens its contacts 50.

When both of the sources 4 and 5 are supplying current to the load circuit 1 and the current output of the station decreases below a predetermined value, relay 22 opens its contacts 40 and effects the deenergization of the control relay 23. The control relay 23 then immediately closes its contacts 50 to complete an energizing circuit for the time relay 26, and after a time interval opens its contacts 41 in the circuit of the relay 24. The relay contacts 41, however, are arranged to be opened before the contacts 48 of relay 26 are opened. If the current output of the station remains below the predetermined value for a predetermined time, the relay 26 opens its contacts 48 in the locking circuit of the master relay 25 which, by opening its contacts 43, effects the opening of the switches 8 and 13 so that the source 5 is disconnected from the load circuit 1.

When the current output of the source 4 decreases to such a value that the current relay 27 closes its contacts 52, a circuit is completed through the contacts 53 of the current relay 28, contacts 52 of the current relay 27, contacts 32 of the contact making voltmeter 19 if the load circuit voltage is normal, winding of time relay 29 and contacts 38 of the master relay 21. After the relay 29 has been energized for a predetermined time, it opens its contacts 39 in the locking circuit of the master relay 21. By opening its contacts 35 the master relay 21 effects the opening of the switches 6 and 12 so that the source 4 is disconnected from the load circuit. By closing its contacts 55 the time relay 29 also completes an energizing circuit for the control relay 30 which, by opening its contacts 47 in the locking circuit of the master relay 25, insures that the source 5 is disconnected from the load circuit whenever the source 4 is disconnected therefrom.

Let it be assumed now that while the source 4 is supplying current to the load circuit 1, an overload condition occurs on the load circuit which causes the relay 22 to close its contacts 40 and effect, in the manner above described, the energization of the control relay 23 and the time relay 24. Also let it be assumed that an abnormal load condition causes sufficient current to flow from the source 4 to effect the opening of the contact 37 of the overcurrent relay 16 so that the switch 12 is opened to remove the shunt from around the current limiting resistor 10. Also let it be assumed that the resistor 10 decreases the current output of the station to such a value that the relay 22 immediately opens its contacts 40. The opening of these contacts 40, however, does not effect the immediate deenergization of the control relay 23 and the time relay 24 because, under these conditions, a locking circuit is completed for the control relay 23 through its contacts 56 and the auxiliary contacts 57 and 58 on the switches 13 and 12 respectively. Therefore, it will be seen that after the time relay 24 has once been energized, it will continue in operation independently of the position of the current relay 22 if both the switches 12 and 13 are in their open positions.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:—

1. In combination, a source of current, a load circuit supplied by said source, means responsive to a predetermined abnormal load condition on said load circuit for decreasing the amount of current supplied thereby to said load circuit, a second source of current, automatic switching means associated with said second source for effecting the connection thereof to said load circuit, timing means arranged after being in operation for a predetermined time to effect the operation of said automatic switching means, control means for effecting the operation of said timing means, and means controlled by said current decreasing means for maintaining said timing means in operation independently of said control means if said current decreasing means operate to decrease the current supplied by said first mentioned source after the operation of said timing means has been initiated.

2. In combination, a source of current, a load circuit supplied by said source, means responsive to a predetermined abnormal load condition on said load circuit for decreasing the amount of current supplied thereby to said load circuit, a second source of current, automatic switching means associated with said second source for effecting the connection thereof to said load circuit, timing means arranged after being in operation for a predetermined time to effect the operation of said automatic switching means, control means controlled by the current supplied to said load circuit for effecting the operation of said timing means, and means controlled by said current decreasing means for maintaining said timing means in operation independently of said control means if said current decreasing means operates to decrease the current supplied by said first mentioned source after the operation of said timing means has been initiated.

3. In combination, a source of current, a load circuit supplied by said source, means responsive to a predetermined abnormal load condition on said load circuit for decreasing the amount of current supplied thereby to said load circuit, a second source of current, automatic switching means associated with said second source for effecting the connection thereof to said load circuit, a time relay arranged when energized for a predetermined time to effect the operation of said automatic switching means, control means for completing an energizing circuit for said time relay when the current supplied to said load circuit exceeds a predetermined value, and means controlled by said current decreasing means for maintaining said time relay energized independently of the position of said control means if said current decreasing means operate to decrease the current supplied by said first mentioned source while said timing relay is energized.

4. In combination, a source of current, a load circuit, current limiting means connected between said source and load circuit, a switch shunting said current limiting means, means for effecting the opening of said switch, a second source of current, automatic switching means associated with said second source for effecting the connection thereof to said load circuit, timing means arranged when operated for a predetermined time to effect the operation of said automatic switching means, control means for effecting the operation of said timing means, and means controlled by said switch for maintaining said timing means in operation independently of the position of said control means if said switch is opened while said timing means is in operation.

5. In combination, a source of current, a load circuit, current limiting means connected between said source and load circuit, a switch shunting said current limiting means, means for effecting the opening of said switch, a second source of current, automatic switching means associated with said second source for effecting the connection thereof to said load circuit, timing means arranged when operated for a predetermined time to effect the operation of said automatic switching means, control means for effecting the operation of said timing means when the current supplied to said load circuit exceeds a predetermined value, and means controlled by said switch for maintaining said timing means in operation independent of the position of said control means if said switch is opened while said timing means is in operation.

6. In combination, a source of current, a load circuit, current limiting means connected between said source and load circuit, a switch shunting said current limiting means, means for effecting the opening of said switch, a second source of current, automatic switching means associated with said second source for effecting the connection thereof to said load circuit, a time relay arranged when energized for a predetermined time to effect the operation of said automatic switching means, control means responsive to a predetermined current output of said first mentioned source for completing an energizing circuit for said time relay, and means controlled by said switch for maintaining said time relay energized independently of the position of said control means if said switch is opened while said timing relay is energized.

DANIEL C. HOFFMANN.